United States Patent
MacKintosh et al.

(10) Patent No.: US 8,495,513 B2
(45) Date of Patent: Jul. 23, 2013

(54) AUTOMATED CONTENT GENERATION THROUGH SELECTIVE COMBINATION

(75) Inventors: Graham Douglas MacKintosh, Manotick (CA); John Andrew Kowal, Ottawa (CA)

(73) Assignee: International Business Machines Corporation, Armonk, NY (US)

(*) Notice: Subject to any disclaimer, the term of this patent is extended or adjusted under 35 U.S.C. 154(b) by 609 days.

(21) Appl. No.: 12/464,445

(22) Filed: May 12, 2009

(65) Prior Publication Data

US 2009/0313568 A1    Dec. 17, 2009

Related U.S. Application Data

(60) Provisional application No. 61/052,749, filed on May 13, 2008.

(51) Int. Cl.
| | |
|---|---|
| *G06F 3/048* | (2006.01) |
| *G06F 3/00* | (2006.01) |
| *G06F 7/00* | (2006.01) |
| *G06F 17/00* | (2006.01) |
| *G06F 17/30* | (2006.01) |
| *G06Q 10/00* | (2012.01) |
| *G06Q 30/00* | (2012.01) |

(52) U.S. Cl.
USPC ........... 715/765; 715/716; 715/764; 715/767; 715/769; 715/810; 715/962; 705/7.29; 705/7.34; 705/7.36; 705/7.38; 707/602; 707/603; 707/706; 707/707; 707/708; 707/709; 707/723; 707/724; 707/725; 707/731; 707/737; 707/738; 707/739; 707/748

(58) Field of Classification Search
USPC .............. 705/7.29, 7.34, 7.36, 7.38; 707/602, 707/603, 706–709, 723–725, 731, 737–739, 748; 715/716, 764, 765, 767, 769, 810, 962
See application file for complete search history.

(56) References Cited

U.S. PATENT DOCUMENTS

| | | | |
|---|---|---|---|
| 6,609,123 B1 | 8/2003 | Cazemier et al. | |
| 6,662,188 B1 | 12/2003 | Rasmussen et al. | |
| 6,995,768 B2* | 2/2006 | Jou et al. | 345/440 |
| 7,383,252 B2 | 6/2008 | Soogoor | |
| 7,403,942 B1* | 7/2008 | Bayliss | 707/748 |
| 7,523,128 B1* | 4/2009 | Miller et al. | 1/1 |
| 7,792,826 B2 | 9/2010 | Statchuk | |
| 7,805,465 B2* | 9/2010 | Dettinger et al. | 707/810 |
| 7,840,569 B2 | 11/2010 | Meyerzon et al. | |
| 2004/0122820 A1* | 6/2004 | Malloy et al. | 707/6 |

(Continued)

*Primary Examiner* — Kieu Vu
*Assistant Examiner* — Eric J Bycer
(74) *Attorney, Agent, or Firm* — Yeen Tham; Edell, Shapiro & Finnan, LLC (57) ABSTRACT

Method and system for merging two objects in a business intelligence system. A first member is selected in the business intelligence system, the business intelligence system includes a user space, a content space, a data space, a master-data space and a metadata space. A relationship between the first member and a plurality of members selected from the group consisting of the user space, the content space, the data space, the master-data space, the metadata space is determined, which results in determined relationships for every member in the business intelligence system. Two members in the content space are then selected. Relationships between the two members in the plurality of determined relationships are traversed to determine the members in the traversed relationships. A preference is assigned to the members in the traversed relationships with close or exact relationships; and the members with the preference are merged.

20 Claims, 11 Drawing Sheets

U.S. PATENT DOCUMENTS

| | | | |
|---|---|---|---|
| 2004/0122844 A1* | 6/2004 | Malloy et al. | 707/102 |
| 2005/0027674 A1* | 2/2005 | Potter et al. | 707/1 |
| 2005/0278304 A1 | 12/2005 | Da Silva et al. | |
| 2006/0026114 A1* | 2/2006 | Gregoire et al. | 707/1 |
| 2006/0031203 A1* | 2/2006 | Rosenbaum et al. | 707/3 |
| 2006/0085434 A1* | 4/2006 | Mah et al. | 707/100 |
| 2006/0184473 A1* | 8/2006 | Eder | 706/20 |
| 2006/0235810 A1* | 10/2006 | Wen et al. | 706/12 |
| 2007/0112761 A1* | 5/2007 | Xu et al. | 707/5 |
| 2007/0118551 A1* | 5/2007 | Akkiraju et al. | 707/102 |
| 2007/0136326 A1* | 6/2007 | McClement et al. | 707/100 |
| 2007/0239746 A1* | 10/2007 | Masselle et al. | 707/101 |
| 2008/0189332 A1 | 8/2008 | Winter | |
| 2008/0195651 A1 | 8/2008 | Rachmiel et al. | |
| 2008/0288306 A1* | 11/2008 | MacIntyre et al. | 705/7 |
| 2009/0018996 A1 | 1/2009 | Hunt et al. | |
| 2009/0100025 A1* | 4/2009 | Binnie | 707/3 |
| 2009/0240699 A1 | 9/2009 | Morgan et al. | |

* cited by examiner

|  | AMERICA | EUROPE | ASIA | TOTAL |
|---|---|---|---|---|
| Q1 | $2,000.00 | $3,000.00 | $1,000.00 | $6,000.00 |
| Q2 | 1,500.00 | 1,000.00 | 800.00 | 3,300.00 |
| Q3 | 3,000.00 | 1,200.00 | 1,100.00 | 5,300.00 |
| Q4 | 3,700.00 | 1,800.00 | 1,500.00 | 7,000.00 |
| TOTAL | $10,200.00 | $7,000.00 | $4,400.00 | |

AUTOMATED CONTENT GENERATION THROUGH SELECTIVE COMBINATION

CROSS-REFERENCE TO RELATED APPLICATIONS

This application is related to and claims priority from U.S. Provisional Application Ser. No. 61/052,749, filed on May 13, 2008, entitled "Method and System For Automated Content Generation through Selective Combination" by Graham Mackintosh and Andrew Kowal, the entire disclosure of which is hereby incorporated by reference for all purposes as if fully set forth herein.

BACKGROUND

The present patent disclosure relates to the field of business intelligence and more particularly to generating new content for display using existing displayed contents.

Many businesses now generate and store information relating to all facets of the business. This information is often stored in data warehouse and databases. The amount of information stored can make finding relevant information difficult. However, timely intelligence is critical to proper business decision making.

A key to success in business today is therefore to understand and effectively manage the factors that drive an enterprise—a field known as business intelligence. Having critical Information about such business drivers allows decisions that will significantly improve results.

To facilitate better business intelligence decisions, organizations have developed data warehouses, which organize and link important customer information from a variety of data stores in a centrally accessible data repository. The data warehouses can include information gathered from various online transaction processing (OLTP) applications that record transactions and/or behaviors of customers when the customers interact with the organizations in some way. The information stored in the data warehouses may also include metadata information regarding the structure and relationship of the information. For example report specifications may be stored that describe information to be presented for a particular report. Additional information may be stored regarding relational models of the information, Dimensional models and Online Analytical Processing (OLAP) cube models as well as other information.

Moreover, organizations deploy a variety of business intelligence reports that allow the organization to use reporting tools, such as OLAP tools to create dimensions, metrics, filters, and templates associated with searching, retrieving, analyzing and viewing the organizations' data. The created dimensions, metrics, filters, and templates combine to form the business intelligence reports that process against the organizations' data in order to display results in tables and/or graphs. Further, the dimensions, metrics, filters, and templates are stored in a metadata format for use by a specific OLAP tool.

Currently business intelligence content consumers who wish to relate and combine two separate pieces of content in order to create new content need to author the desired content de novo.

There is therefore a need for a method and system that the a user can relate and create new business intelligence report directly and immediately based on the relationship of the underlying business intelligence objects.

SUMMARY

According to an aspect of the present patent disclosure there is provided a computer-implemented method for merging two objects in a business intelligence system, the method comprising: selecting a first member in the business intelligence system, the business intelligence system having a user space, a content space, a data space, a master-data space and a metadata space; determining a relationship between the first member and a plurality of members selected from the group consisting of the user space, the content space, the data space, the master-data space, the metadata space and a combination thereof, resulting in a plurality of determined relationships for every member in the business intelligence system; selecting two members in the content space; traversing relationships between the two members in the plurality of determined relationships; determining the members of the business intelligence system in the traversed relationships; assigning a preference to the members of the business intelligence system in the traversed relationships with close or exact relationships; and merging the members with the preference.

According to another aspect of the present patent disclosure there is provided a computer readable medium storing instructions or statements for use in the execution in a computer of a method for merging two objects in a business intelligence system, the method comprising steps of: selecting a first member in the business intelligence system, the business intelligence system having a user space, a content space, a data space, a master-data space and a metadata space; determining a relationship between the first member and a plurality of members selected from the group consisting of the user space, the content space, the data space, the master-data space, the metadata space and a combination thereof, resulting in a plurality of determined relationships for every member in the business intelligence system; selecting two members in the content space; traversing relationships between the two members in the plurality of determined relationships; determining the members of the business intelligence system in the traversed relationships; assigning a preference to the members of the business intelligence system in the traversed relationships with close or exact relationships; and merging the members with the preference.

According to another aspect of the present patent disclosure there is provided a computer system for merging two objects in a business intelligence system, the computer system comprising: means for selecting a first member in the business intelligence system, the business intelligence system having a user space, a content space, a data space, a master-data space and a metadata space; means for determining a relationship between the first member and a plurality of members selected from the group consisting of the user space, the content space, the data space, the master-data space, the metadata space and a combination thereof, resulting in a plurality of determined relationships for every member in the business intelligence system; means for selecting two members in the content space; means for traversing relationships between the two members in the plurality of determined relationships; means for determining the members of the business intelligence system in the traversed relationships; means for assigning a preference to the members of the business intelligence system in the traversed relationships with close or exact relationships; and means for merging the members with the preference.

Preferably, a display of the merged members in the content space is optimized.

Preferably, the relationship is transitive.

Preferably, the relationship is within one space selected from the group consisting of the user space, the content space, the data space, the master-data space, and the metadata space.

Preferably, the relationship is based on a popularity of the first member.

Preferably, the relationship includes one member selected from the group consisting of: citation, combination, subordination, peer, instance, subscription and external reference.

Preferably, the merging results from a drag-and-drop action in the user space.

Preferably, the merging is based on a preference in the user space.

Preferably, the merging is based on a locale in the user space.

Preferably, the first member resides in an intersection of two of the data space, the master-data space and the metadata space.

BRIEF DESCRIPTION OF THE DRAWINGS

These and other features of the patent disclosure will become more apparent from the following description in which reference is made to the appended drawings wherein:

FIGS. 9 (a) and (b) show a user interface for combing two charts to generate a new chart;

DETAILED DESCRIPTION OF EMBODIMENTS

The present patent disclosure relates to improving the relevance of search results for business intelligence content. Search results may be displayed to a business intelligence system user and ordered based on their determined relevance.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in base-band or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as JAVA, SMALLTALK, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Using the described embodiments of the present patent disclosure, business intelligence Users searching for information in business intelligence systems and related data stores, for example, structured or unstructured data stores, can more efficiently and accurately locate the desired information by searching using terms they are familiar with and, at the same time, by relying on the business intelligence system to rank the results using the collective intelligence of the business intelligence system, for example but is not limited to, the usage behavior of the individual user and larger userbase as a whole. This allows for leveraging known relationships to adjust the rankings of the different objects, and their related terms in the business intelligence system.

Figure 1:
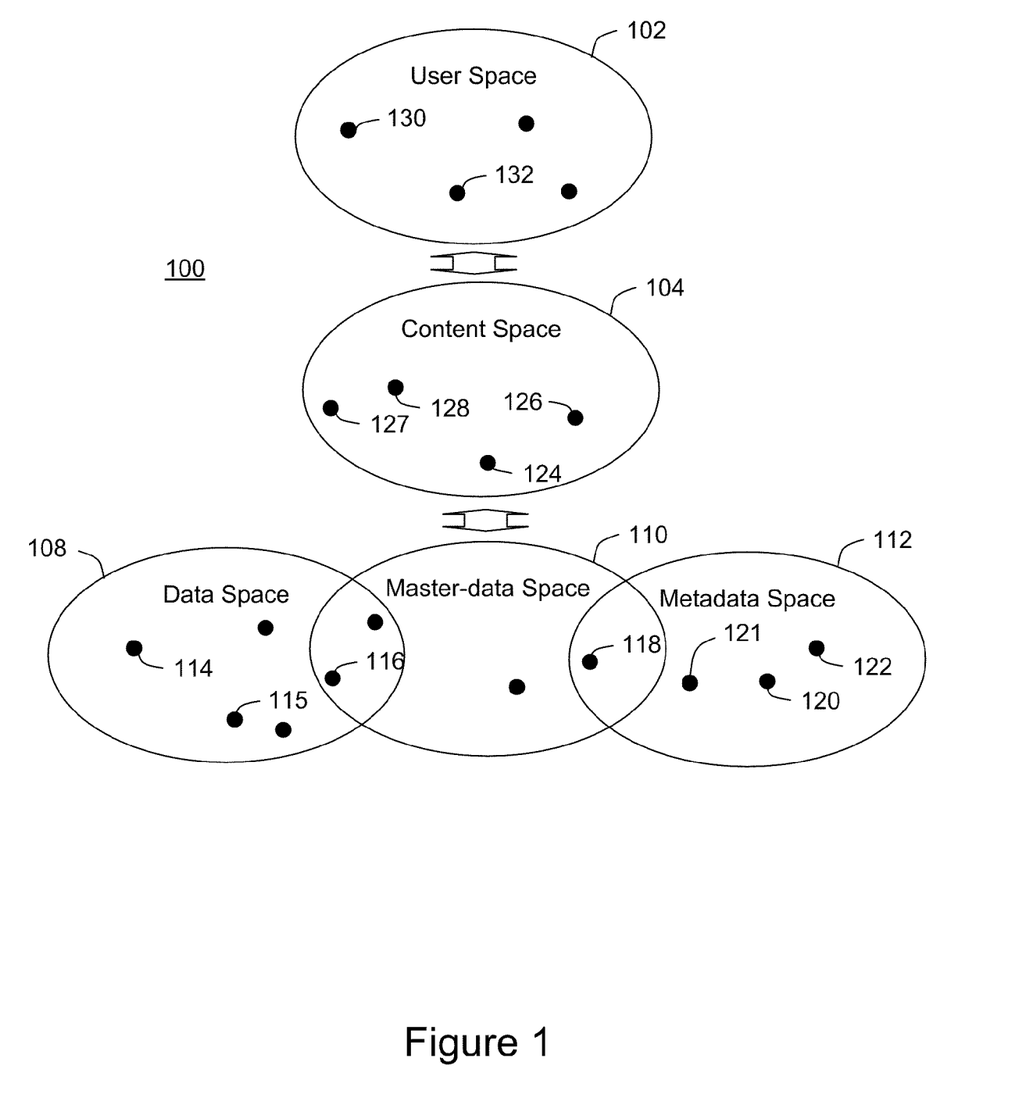
FIG. 1 shows a business intelligence system in which the embodiments of the present patent disclosure may be practiced.

FIG. 1 shows a business intelligence system in which the embodiments of the present patent disclosure may be practiced. The business intelligence system 100 includes a plurality of spaces to describe possible arrangement of content stored in a business intelligence system. The business intelligence system 100 includes, for example, but is not limited to, a user space 102, a content space 104, a data space 108, a master-data space 110 and a metadata space 112. As illustrated in FIG. 1, users generally interact with the content space, for example, a user may define a layout of a business intelligence report. A business intelligence report may in turn be defined by the objects in the data space 108, master-data space 110 and metadata space 112. Members of the user space 102 may include, for example, a user 130, and a subordinate 132 of the user 130. Members of the content space 104 may include, for example, business intelligence reports such as "inventory in Asia" 128; "margin in Asia" 126; "revenue by country" 127; and "margin in Europe" 124. Members of the data space 108 may include, for example, "Asia" 114, "Europe" 116 and "Canada" 115. Members of the metadata space 112 include, for example, "inventory" 118, "regions" 120, "countries" 121 and "margin" 122. Metadata in a business intelligence system have been described, for example, in U.S. Pat. No. 6,662,188 "Metadata model" to Rasmussen et al., and U.S. Pat. No. 6,609,123 "Query engine and method for querying data using metadata model" to Cazemier et al., which are incorporated by reference in their entireties. Master data in the master data space 110 are generally reference data describing a physical or virtual object and its properties, and shared over a number of systems. Collecting, aggregating, matching, consolidating and distributing master data throughout the systems is provided by a master data management to ensure consistency and control in the ongoing maintenance and application use of this information.

These members or business intelligence content can be retrieved for a given search query such as people, data, metadata, reports, etc. The members grouped into different business intelligence spaces may be related to each other in different ways. If the stored objects are treated independently, full-text search results may give acceptable results, however the search does not leverage known business intelligence relationships that are stored.

Figure 2:
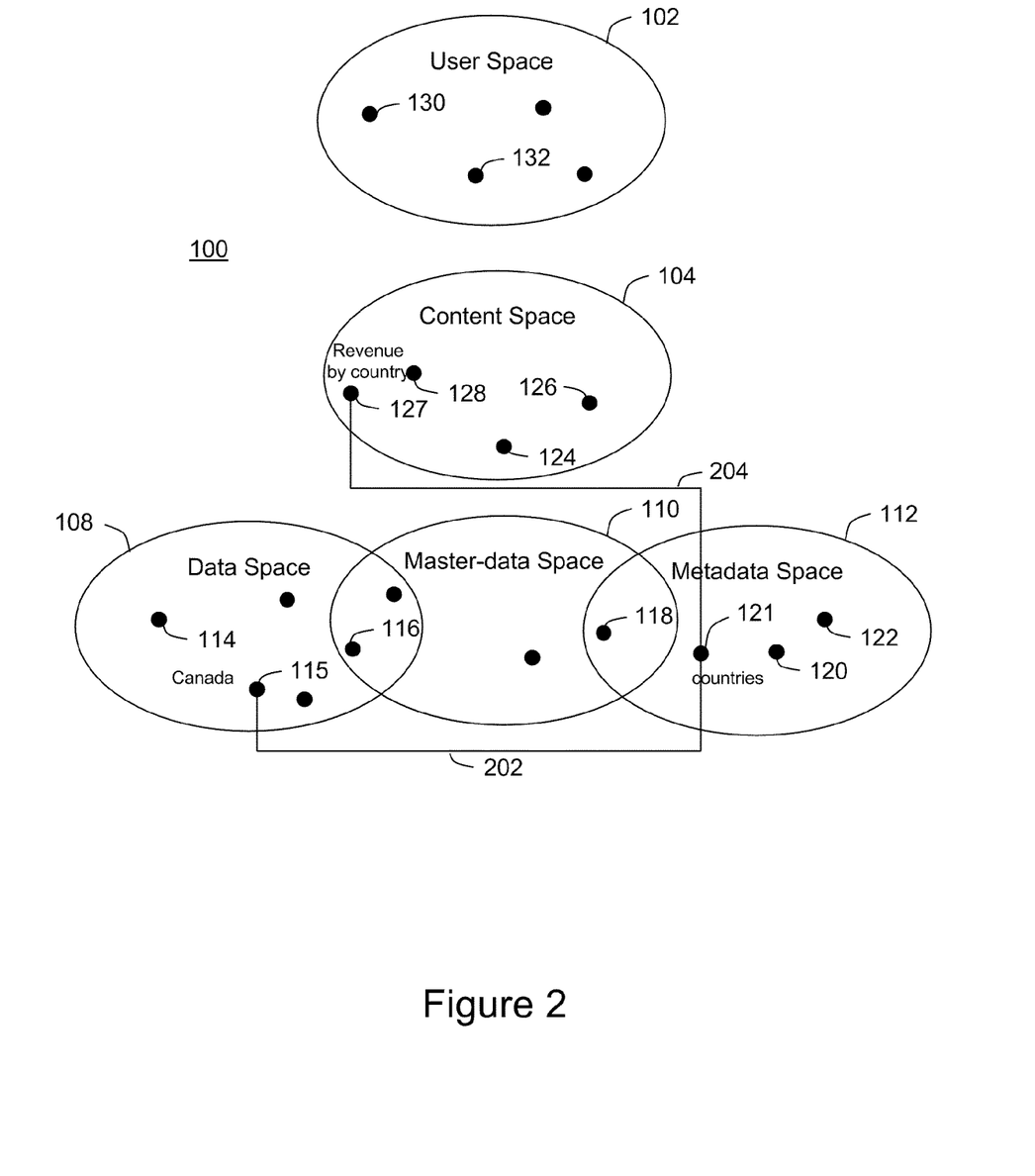
FIG. 2 illustrates relationships between stored business intelligence content.

FIG. 2 shows relationships between stored business intelligence content. Many one-way relationships are transitive: if user A has a particular one-way relationship with user B, and user B has a similar one-way relationship with user C, then if the relationship is transitive it can be inferred that user A has this same one-way relationship with user C.

It is possible to extend the simple full-text search to utilize some of the transitive relationships in the business intelligence system. Referring to FIG. 2, a system may include a list of countries in the data space 108 that are clearly defined as countries 121 in the metadata space 112. There may also exists a report on revenue by countries 127 in the content space 104.

Using stock full-text with the term "Canada" would result in determining that the term "Canada" is in a particular database table. On the other side, the transitive relationship may be leveraged to traverse this graph and return the report "Revenue by Country" 127 as a result, given the direct relationships 202, 204 between the "Revenue by Country" 127 report and term "Canada" 115.

In addition to using the transitive relationships 202, 204 described above, the embodiments of the present patent disclosure leverage the user space 102, or relationships within a given space. The additional relationship information may be used to indicate, for example, that multiple members in the content space 104 are being used in a given report, portal or dashboard, or the popularity of a given report within a reporting hierarchy, or the popularity of a given report as a citation or drill target.

Figure 3:
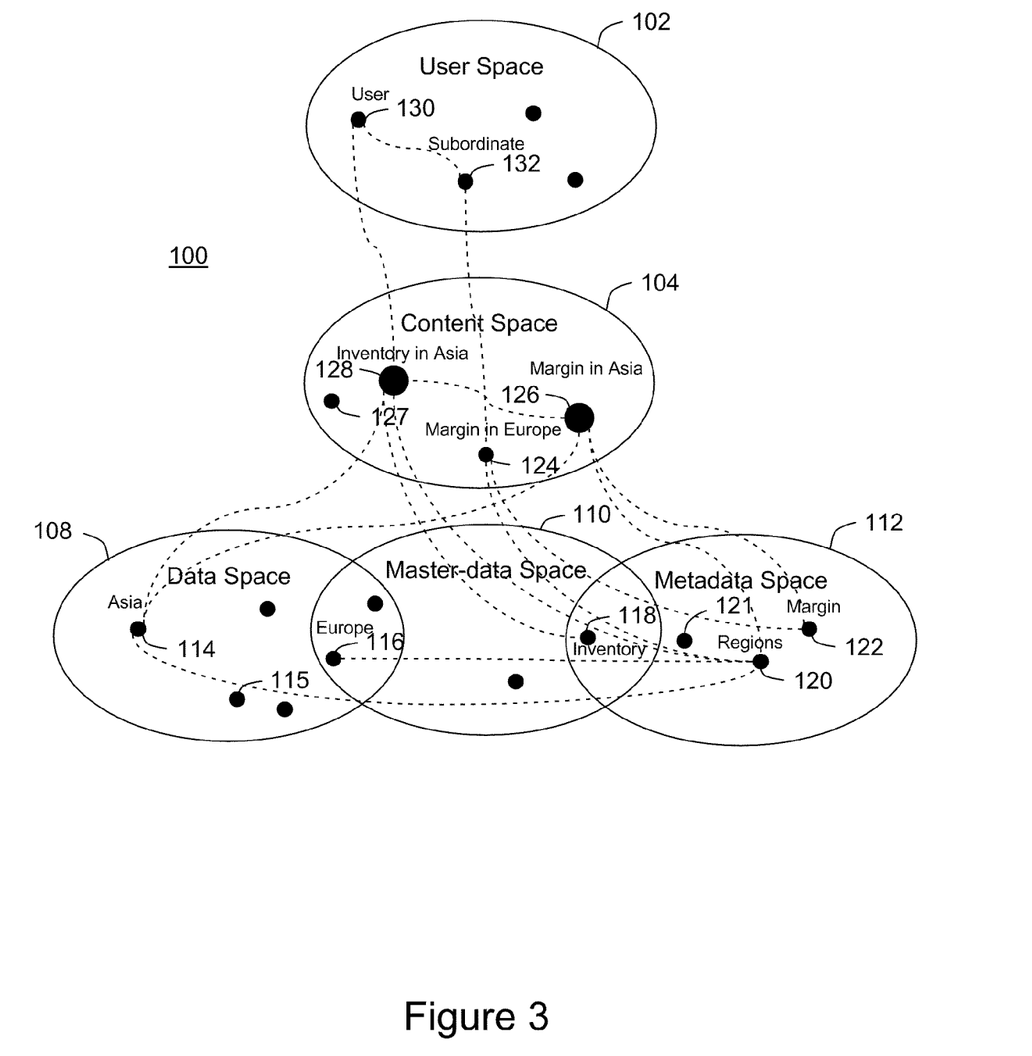
FIG. 3 shows exemplary relationships between stored content in different spaces.

FIG. 3 shows exemplary relationships between stored content in different spaces. The relationships may be used as a leverage to provide improved search results. One embodiment of the present patent disclosure uses the entire member set of a given business intelligence system as a network of nodes contained within a variety of different spaces. The members in the user space 102, content space 104, data space 108, master-data space 110 and metadata space 112, for example, "Asia" 114, "Inventory in Asia" 128, may be considered as the nodes of the network, while the relationships, for example, between "Inventory in Asia" 128 and "Asia" 114 may be considered as the vertices of the network. The nodes are then assigned a given ranking based on their relationships within a space as well as between spaces. These rankings are intended to indicate a degree of semantic knowledge of the value of a given business intelligence system.

Referring to FIG. 3, report "Margin in Asia" 126 has a boosted ranking, as indicated by increased size of the member. Neither the user 130 nor the subordinate 132 is subscribed to this report, however it is considered more relevant to the user 130 because it relates to a topic that matters to the user's subordinate 132. In this fashion the entire network can have associated rankings that accurately indicate usage, and evolve as usage evolves.

These nodes represent a network of relationships, and the ranking of a given node is determined by the relationships with the others. This ranking can then be inherited by individual terms and then exposed to third-party search for enhanced relevance.

The embodiments of the present patent disclosure leverage the above described declared relationships. Referring to FIG. 3, the relationships may include, but are not limited to:

Citation: for example, the member "Canada" 115 may refer to or drill to the member "Countries" in metadata space 121. Other examples of citation include usage tracking as members are selected for viewing or further use.

Combination: two originally unrelated members, for example, "Margin in Europe" 124 and "Margin in Asia" 126 are combined by a user into a composite report, portal, or dashboard.

Subordination: for example, a user reporting and responsibility structure. A ranking may be influenced inversely to the standard method, such as the case where all subordinates 132 are interested in what the superior 130 is interested in.

Peer: examples include: employee responsibility area, level, geography, and department.

Instance 128, 122: examples include: stored output of a report "Inventory in Asia" 128 and data instance of a metadata type "Margin" 122.

Subscription: for example, a user 130 regularly reads a report 127.

External references: for example, a given term's (e.g., "Asia" 114) popularity in an unstructured system or linguistic ontology.

Figure 4A:
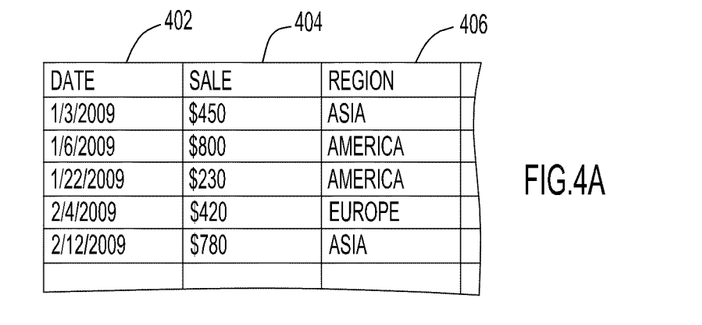
FIG. 4(a) shows a portion of raw data used in the business intelligence system.

The network of relationships can be utilized to create new content using existing contents. FIG. 4(a) shows a portion of underlying raw data which include, for example, the details about how dates 402 are organized for financial reporting, for example in quarters; and the details around how geographies are handled 406, for example in regions, and invoices detailing actual purchases 404.

Figure 4B:
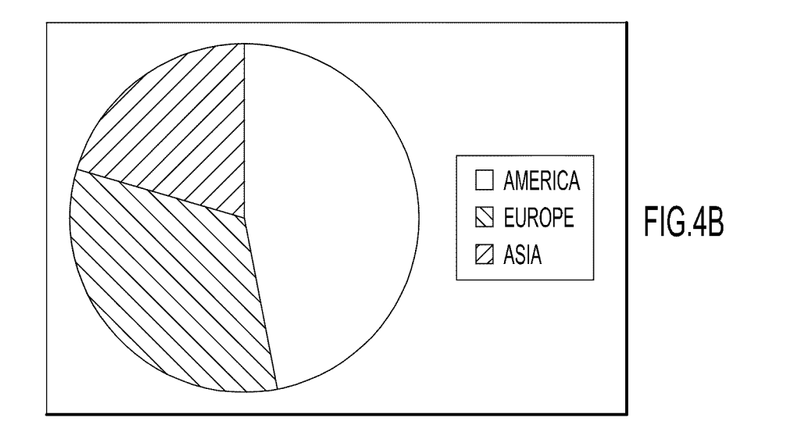
FIG. 4(b) shows a pie chart.
Figure 4C:
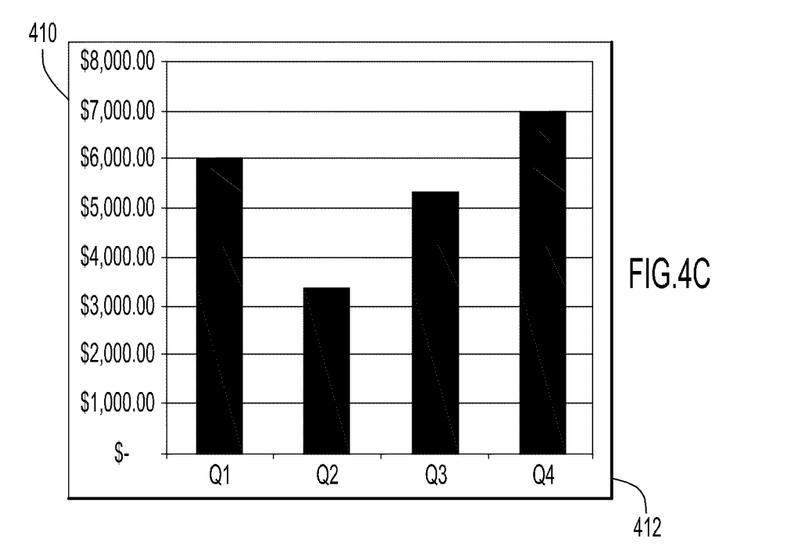
FIG. 4(c) shows a bar chart.

FIG. 4(b) and FIG. 4(c) show two reports based on the data exemplified in FIG. 4(a). A pie 408 indicating the proportion contribution is shown in FIG. 4(b). Revenues 410 are shown in FIG. 4 (c) as divided by quarters 412.

Figure 5:
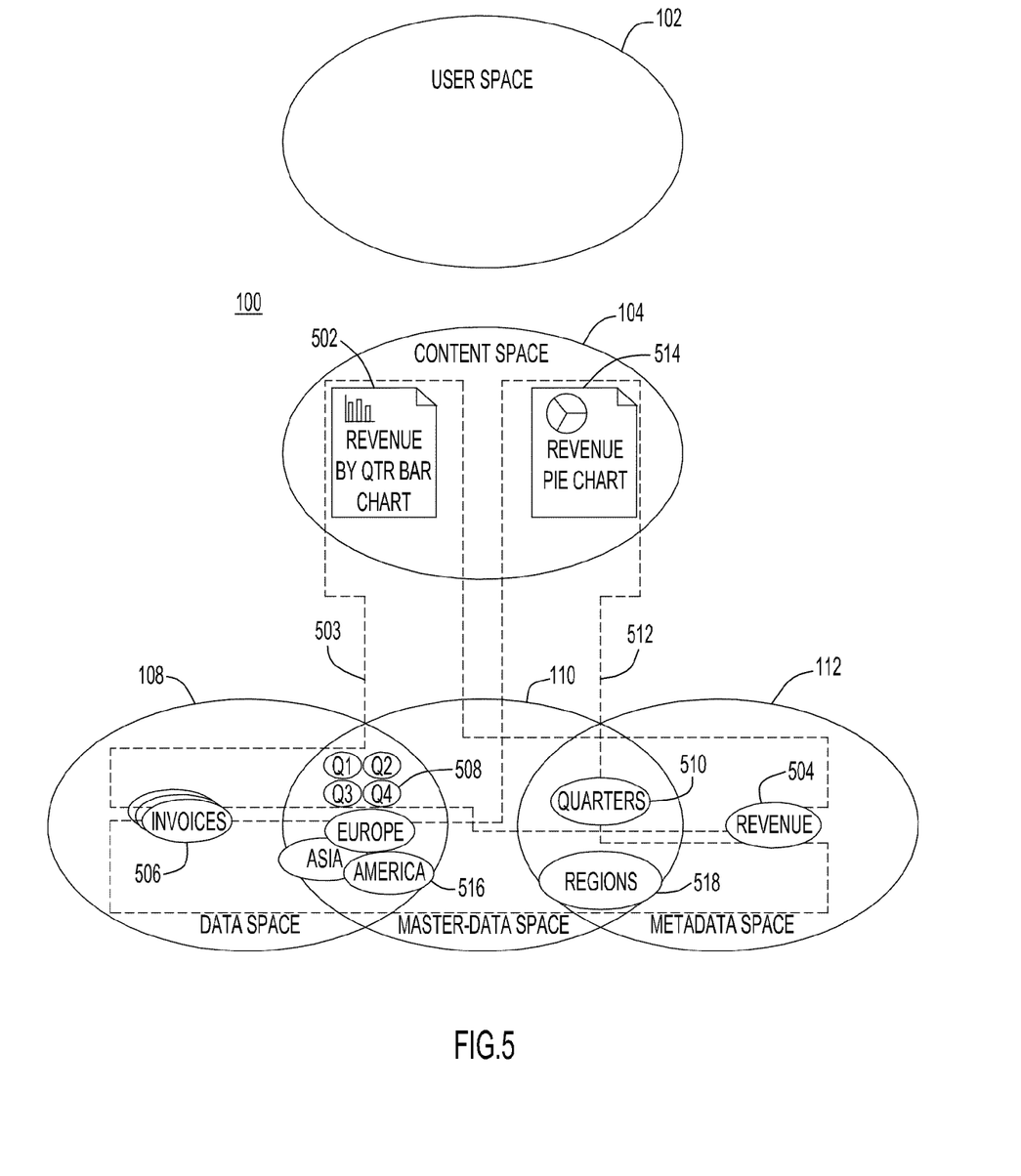
FIG. 5 shows the relationships between the members in different spaces.

FIG. 5 shows the relationships between the members in different spaces 108, 110, 112, and how the bar chart 502, as shown in FIG. 4(b) 503, uses revenue values 504 in the metadata space 112 calculated from the invoices 506 in data space 108 and charts them against a date series 508. Here, the date series 508 are considered as master data in the master-data space 110 as well. Similarly, "quarters" 510 is a member in the metadata space 112 which also resides in the master-data space 110.

FIG. 5 further shows 512 that the pie chart 514 in FIG. 4(b) uses revenue values 504 calculated from the invoices 506 and charts them in a pie showing proportional contribution by regions. Here, the members "Asia" "Europe" and "America" 516 are members of the data space 108, and the member "regions" 518 is considered as metadata. Both "Asia" "Europe" and "America" 516 and "regions" 518 are also considered as master data.

Figure 6:
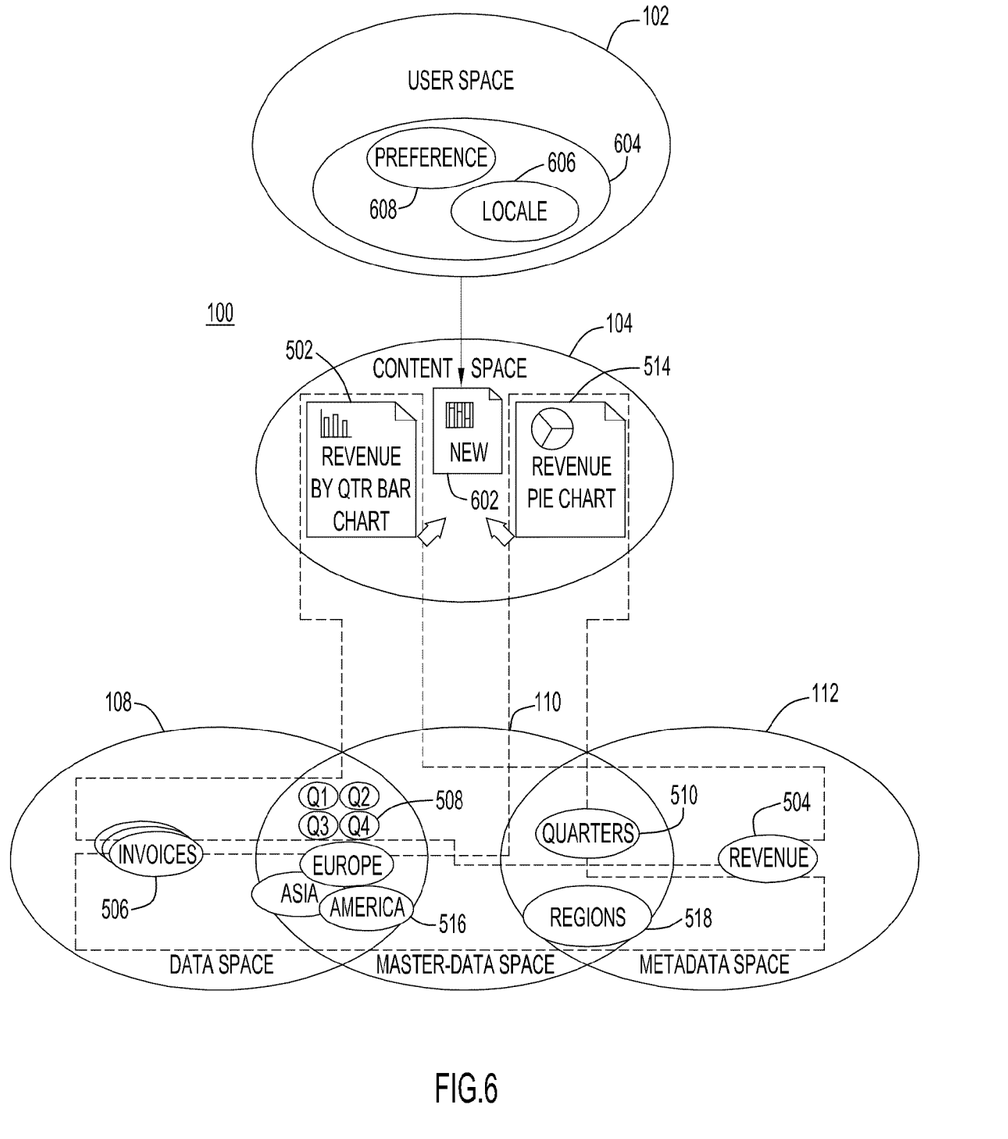
FIG. 6 shows the generation of new content in accordance with one of the described embodiments.

Referring to FIG. 6, when a user chooses to combine two existing members 502, 514 in the content space 104, to create a new object 602, the new object 602 merges the queries and data at the lowermost level, as well as semantics and representation at the higher level 604.

As described below, a user may choose to request the combination, sometimes also referred to as "mash" or "mashup", of members 502, 514 by drag-and-drop operation. The business intelligence system then calculates all possible relationships. From this the business intelligence creates a virtual datamart from which to build the final combined object.

Figure 7:
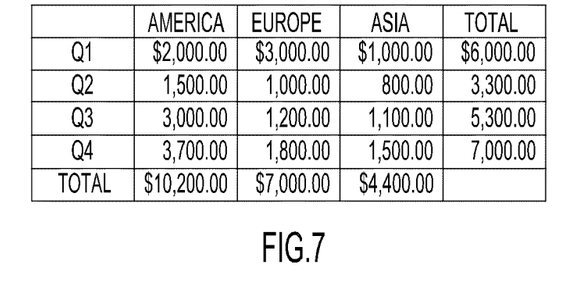
FIG. 7 is a presentation of the merged dataset.

FIG. 7 is a possible presentation of the merged dataset in the data space through the combination of the members in the content space 104.

Figure 8:
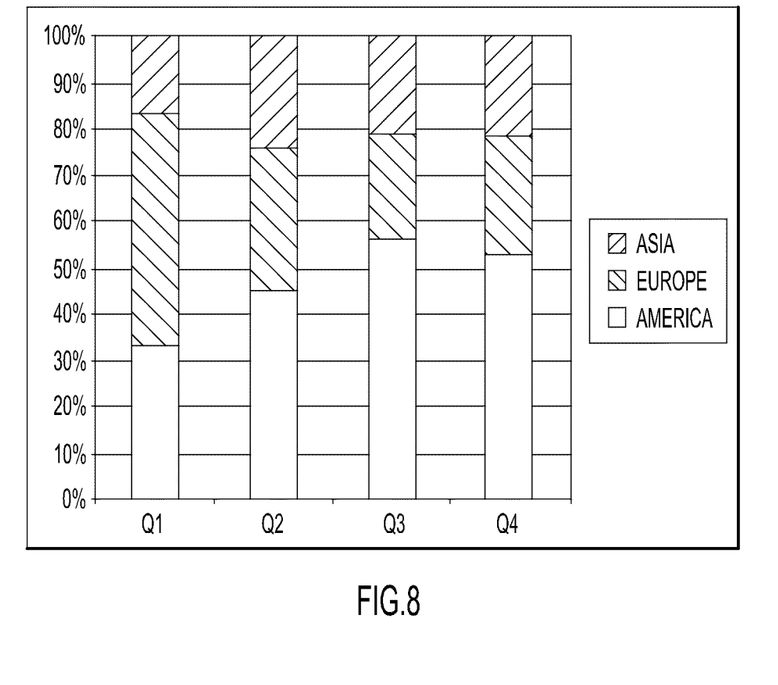
FIG. 8 illustrates a newly generated content.

The merge as described in the above example combines the aspects of the pie chart 514 with proportional contribution, and the bar chart 502 with grouped distribution. The final content 602 is created taking into account, for example but not limited to, locale 606, preferences 608, for example, themes and security aspects of the user to create a proportional bar chart 602, as illustrated in FIG. 8.

Figure 9A:
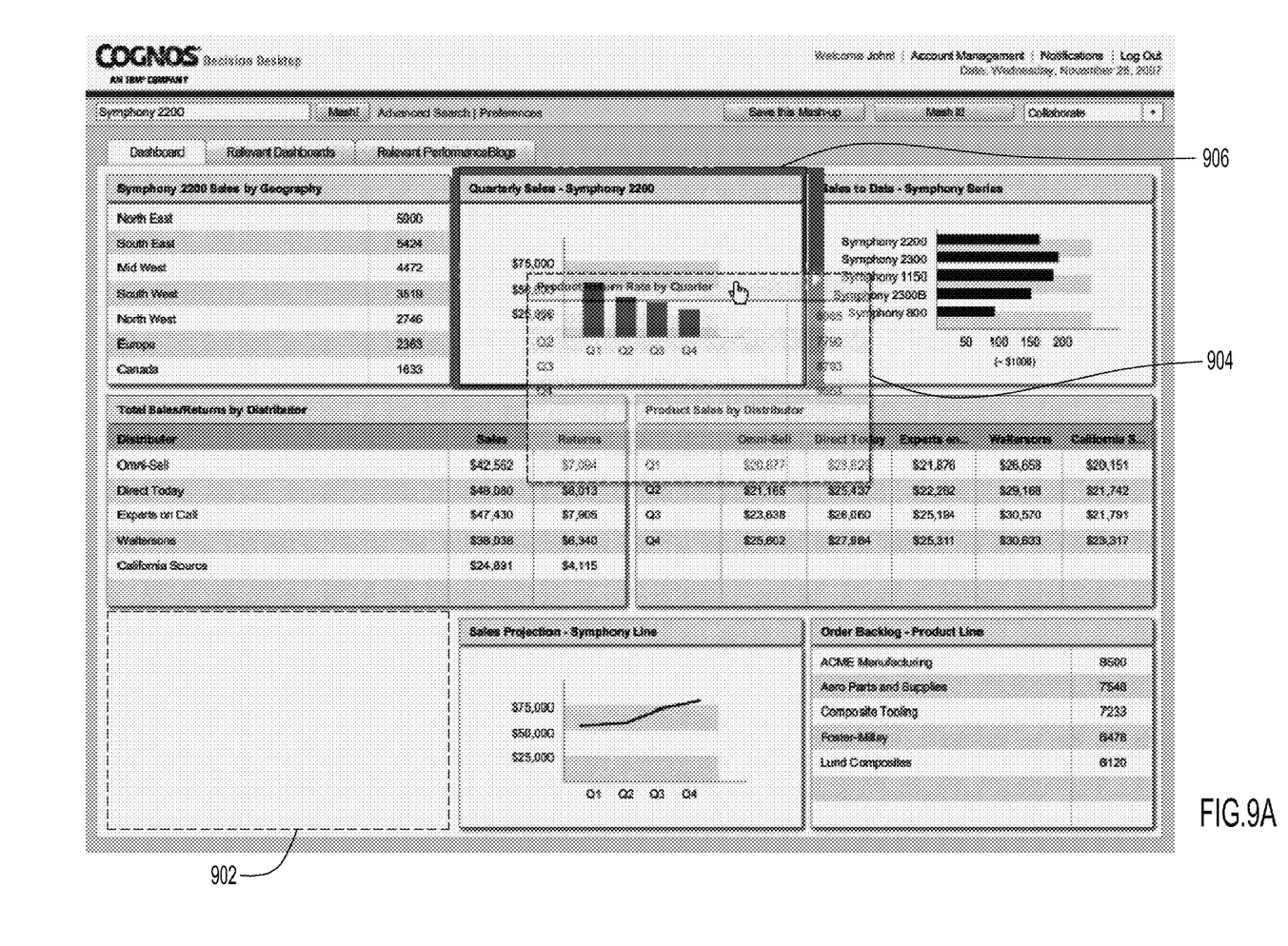

FIG. 9 (a) shows a user interface for combing two charts to generate a new chart. Chart 902 is moved by a use, for example, through "drag-and drop" 904 onto a second chart 906. Other methods for combining the objects include, for example but not limited to, "multi-select then act" using check-boxes and a "combine" button, and a "right-click/combine" action.

Figure 9B:
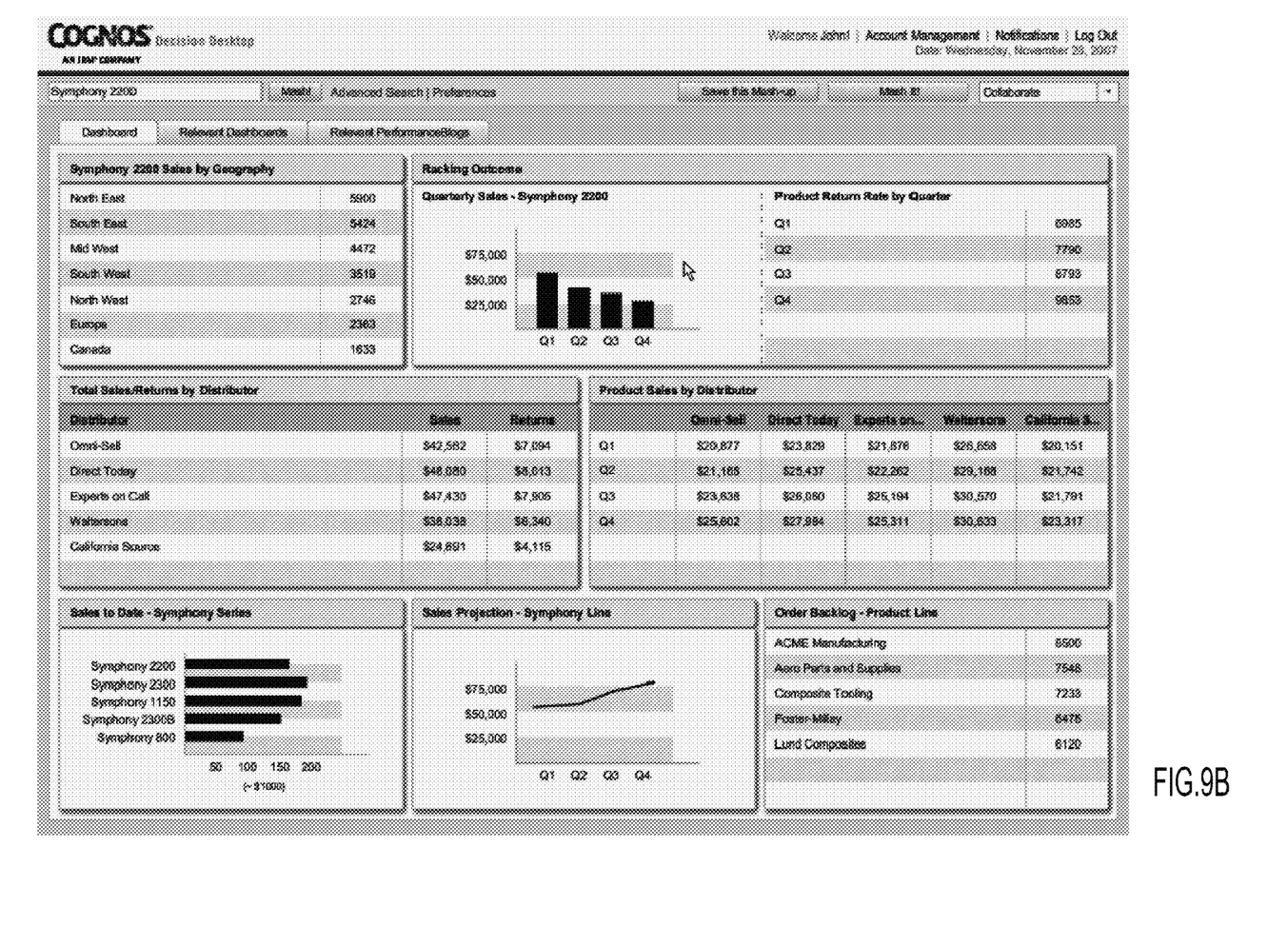

The combination of underlying data, metadata and semantics is accomplished by comparing the constituent components of each combined object, traversing known relationship paths between them, and favouring those with the closest or exact relationship in light of the attributes of the user performing the action. The combination and optimization of the display mechanisms for the final objects to display the appropriate data, as related by metadata and presented as per the appropriate and determined semantics, in combination with a given set of rules for the display of the final set of information. An example of the combination result of charts 902 and 906 in FIG. 9(a) is shown in FIG. 9(b).

The interface allows a user to select a given object and combine with one or more other objects. These objects may be a pre-authored instance, in the form of a chart or table that relays a given view of a given business situation; a canonical object from a library of simple primitive types, in the form of a simple chart type or a simple table type; a canonical object from a library of more semantically complex objects or analytic types, for example, a generic sales pipeline chart; and a generic plan-v-actual bar chart.

Figure 10:
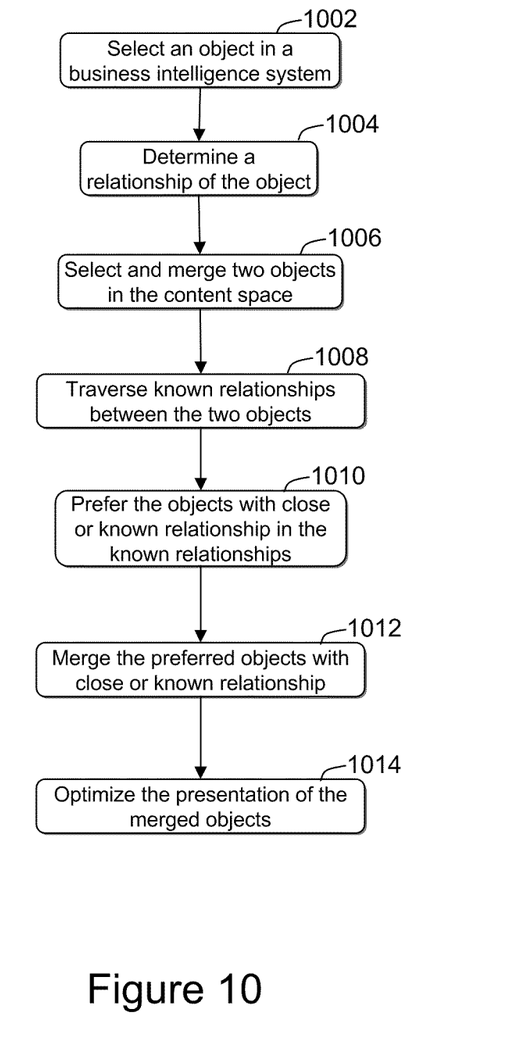
FIG. 10 shows exemplary flow chart to generate a new content by combining existing content.

FIG. 10 shows an exemplary embodiment of merging two objects in the content space 104 of a business intelligence system 100. For every member 1002 in the user space 102, content space 104, data space 106, master-data space 110 and metadata space 112, a relationship is determined 1004. Two members of the content spaces 104 are selected 1006, and their relationship paths are traversed 1008 to find all the members along the relationships, in different spaces. The members with close or exact relationships are preferred 1010 for merging into a new content 1012. The new content are optimized 1014 for displaying in content space 104.

Figure 11:
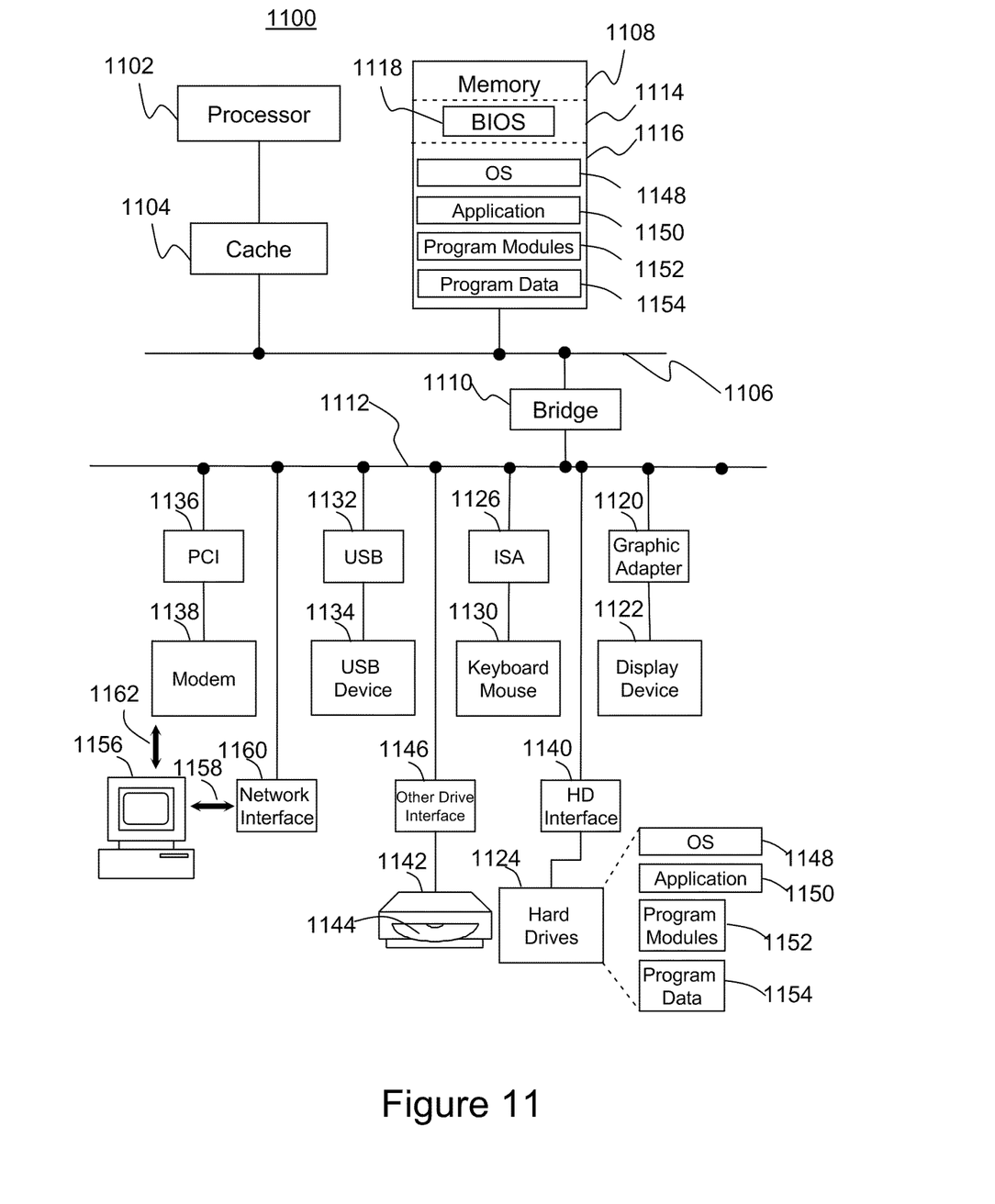
FIG. 11 shows a generic computing environment in which the present patent disclosure may be implemented.

FIG. 11 and the following discussion are intended to provide a brief general description. FIG. 11 illustrates a block diagram of a suitable computing environment in which an embodiment of the present patent disclosure may be implemented.

Those skilled in the art will appreciate that the patent disclosure may be practiced with many computer system configurations, including personal computers, hand-held devices, multi-processor systems, microprocessor-based or programmable consumer electronics, network PCs, mini-computers, mainframe computers and the like. The patent disclosure may also be practiced in distributed computing environments where tasks are performed by remote processing devices that are linked through a communications network. In a distributed computing environment, program modules may be located in both local and remote memory storage devices.

Although not required, the patent disclosure will be described in the general context of computer-executable instructions, such as program modules, being executed by a personal computer. Generally, program modules include routines, programs, objects, components, data structures and the like that perform particular tasks or implement particular abstract data types.

With reference to FIG. 11, an exemplary system 1100 for implementing the patent disclosure may be, for example, one of the general purpose computers. The system 1100 includes processor 1102, which in the exemplary embodiment are each connected to cache memory 1104, the cache 1104 is connected in turn to a system bus 1106 that couples various system components.

Also connected to system bus 1106 are a system memory 1108 and a host bridge 1110. Host bridge 1110 connects I/O bus 1112 to system bus 1106, relaying and/or transforming data transactions from one bus to the other. The system bus 1106 and the I/O bus 1112 may be any of several types of bus structures including a memory bus or memory controller, a peripheral bus, and a local bus using any of a variety of bus architectures. The system memory includes read-only memory (ROM) 1114 and random access memory (RAM) 1116. A basic input/output system 1118 (BIOS), containing the basic routines that help to transfer information between elements within the personal computer 1100, such as during start-up, is stored in ROM 1114.

In the exemplary embodiment, the system 1100 may further include a graphics adapter 1120 connected to I/O bus 1112, receiving user interface information for display device 1122. A user may enter commands and information into the system 1100 through input devices 1130 such as a conventional mouse, a keyboard 1130, or the like. Other input devices 1134 may include a microphone, joystick, game pad, satellite dish, scanner or the like. The devices may be connected via an Industry Standard Architecture (ISA) bridge 1126, or a Universal Serial Bus (USB) bridge 1132 to I/O bus 1112, respectively. PCI device such as a modem 1138 may be connected to the I/O bus 1112 via PCI bridge 1136.

The exemplary system 1100 may further include a hard disk drive 1124 for reading from and writing to a hard disk, connected to the I/O bus via a hard disk interface 1140, and an optical disk drive 1142 for reading from or writing to a removable optical disk 1144 such as a CD-ROM or other optical media. The hard disk drive 1124 and optical disk drive 1142 may be connected to the I/O bus 1112 by a hard disk drive interface 1140, and an optical drive interface 1146, respectively. The drives and their associated computer-readable media provide non-volatile storage of computer readable instructions, data structures, program modules and other data for the system 1100. Although the exemplary environment described herein employs a hard disk 1124 and a removable optical disk 1144, it should be appreciated by those skilled in the art that other types of computer readable media which can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk 1124, optical disk 1144, ROM 1118 or RAM 1116, including an operating system 1148, one or more application programs 1150, other program modules 1152 and program data 1154.

The exemplary system 1100 may operate in a networked environment using logical connections to one or more remote computers, such as a remote computer 1156. The remote computer 1156 may be another personal computer, a server, a router, a network PC, a peer device or other common network node, and typically includes many or all of the elements described above relative to the exemplary system 1100. The logical connections depicted in FIG. 11 include a network 1158, for example, a local area network (LAN) or a wide area network (WAN). Such networking environments are commonplace in offices, enterprise-wide computer networks, Intranets and the Internet.

When used in a networking environment, the exemplary system 1100 is connected to the local network 1158 through a network interface or adapter 1160. The exemplary system 1100 may use the modem 1138 or other means for establishing communications 1162 over a wide area network such as the Internet. In a networked environment, program modules depicted relative to the exemplary system 1100, or portions thereof, may be stored in the remote memory storage device. It will be appreciated that the network connections shown are exemplary and other means of establishing a communications link between the computers may be used.

The exemplary embodiment shown in FIG. 11 is provided solely for the purposes of explaining the patent disclosure and those skilled in the art will recognize that numerous variations are possible, both in form and function. For instance, the exemplary system 1100 may also include a magnetic disc drive, and numerous other optional components. All such variations are believed to be within the spirit and scope of the present invention. The exemplary system 1100 and the exemplary figures below are provided solely as examples for the purposes of explanation and are not intended to imply architectural limitations. In fact, this method and system can be easily adapted for use on any programmable computer system, or network of systems, on which software applications can be executed.

Embodiments within the scope of the present patent disclosure can be implemented in digital electronic circuitry, or in computer hardware, firmware, software, or in combinations thereof. Apparatus within the scope of the present patent disclosure can be implemented in a computer program product tangibly embodied in a machine-readable storage device for execution by a programmable processor; and method actions within the scope of the present patent disclosure can be performed by a programmable processor executing a program of instructions to perform functions of the patent disclosure by operating on input data and generating output. Embodiments within the scope of the present patent disclosure may be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files. Embodiments within the scope of the present patent disclosure include computer-readable media for carrying or having computer-executable instructions, computer-readable instructions, or data structures stored thereon. Such computer-readable media may be any available media, which is accessible by a general-purpose or special-purpose computer system. Examples of computer-readable media may include physical storage media such as RAM, ROM, EPROM, CD-ROM or other optical disk storage, magnetic disk storage or other magnetic storage devices, or any other media which can be used to carry or store desired program code means in the form of computer-executable instructions, computer-readable instructions, or data structures and which may be accessed by a general-purpose or special-purpose computer system. Any of the foregoing can be supplemented by, or incorporated in, ASICs (application-specific integrated circuits). While particular embodiments of the present patent disclosure have been shown and described, changes and modifications may be made to such embodiments without departing from the true scope of the invention.

Reference has been made in detail to some specific embodiments of the patent disclosure including the best modes contemplated by the inventors for carrying out the invention. Examples of these specific embodiments are illustrated in the accompanying drawings. While the patent disclosure is described in conjunction with these specific embodiments, it will be understood that it is not intended to limit the patent disclosure to the described embodiments. On the contrary, it is intended to cover alternatives, modifications, and equivalents as may be included within the spirit and scope of the patent disclosure as defined by the appended claims. In the following description, numerous specific details are set forth in order to provide a thorough understanding of the present invention. The present patent disclosure may be practiced without some or all of these specific details. In other instances, well-known process operations have not been described in detail in order not to unnecessarily obscure the present invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present patent disclosure has been presented for purposes of illustration and description, but is not intended to be exhaustive or limited to the patent disclosure in the form disclosed. Many modifications and variations will be apparent to those of ordinary skill in the art without departing from the scope and spirit of the invention. The embodiment was chosen and described in order to best explain the principles of the patent disclosure and the practical application, and to enable others of ordinary skill in the art to understand the patent disclosure for various embodiments with various modifications as are suited to the particular use contemplated.

What is claimed is:

1. A computer-implemented method for merging two objects in a business intelligence system including a user space, a content space, a data space, a master-data space and a metadata space, the method comprising:

determining relationships between members selected from at least one of the user space, the content space, the data space, the master-data space, and the metadata space, resulting in a plurality of determined relationships for the members in the business intelligence system, wherein the determined relationships link the members in the business intelligence system;

enabling selection of two members in the content space to be combined, wherein each of the two members includes a chart and the combination of the two members produces a new chart;

traversing relationships for each of the two members with other members in the business intelligence system in the plurality of determined relationships;

determining the members of the business intelligence system in the traversed relationships, wherein the determined members provide information pertaining to the charts;

assigning a preference for merging to the members of the business intelligence system in the traversed relationships with close or exact relationships; and merging the selected two members from the content space to produce the new chart by merging into the new chart the determined members in the traversed relationships with the assigned preference.

2. The computer-implemented method as claimed in claim 1, further comprising the step of optimizing a display of the merged members in the content space.

3. The computer-implemented method as claimed in claim 1, wherein at least one relationship is transitive.

4. The computer-implemented method as claimed in claim 1, wherein at least one relationship is within one space selected from the group consisting of the user space, the content space, the data space, the master-data space, and the metadata space.

5. The computer-implemented method as claimed in claim 1, wherein at least one relationship is based on a popularity.

6. The computer-implemented method as claimed in claim 1, wherein at least one relationship includes one member selected from the group consisting of:

citation, combination, subordination, peer, instance, subscription and external reference.

7. The computer-implemented method as claimed in claim 1, wherein the merging results from a drag-and-drop action in the user space.

8. The computer-implemented method as claimed in claim 1, wherein the merging is based on a preference in the user space.

9. The computer-implemented method as claimed in claim 1, wherein the merging is based on a locale in the user space.

10. The computer-implemented method as claimed in claim 1, wherein at least one member resides in an intersection of two of the data space, the master-data space and the metadata space.

11. A computer readable medium of a memory device storing instructions or statements for use in the execution in a computer of a method for merging two objects in a business intelligence system including a user space, a content space, a data space, a master-data space and a metadata space, the method comprising:

determining relationships between members selected from at least one of the user space, the content space, the data space, the master-data space, and the metadata space, resulting in a plurality of determined relationships for the members in the business intelligence system, wherein the determined relationships link the members in the business intelligence system;

enabling selection of two members in the content space to be combined, wherein each of the two members includes a chart and the combination of the two members produces a new chart;

traversing relationships for each of the two members with other members in the business intelligence system in the plurality of determined relationships;

determining the members of the business intelligence system in the traversed relationships, wherein the determined members provide information pertaining to the charts;

assigning a preference for merging to the members of the business intelligence system in the traversed relationships with close or exact relationships; and merging the selected two members from the content space to produce the new chart by merging into the new chart the determined members in the traversed relationships with the assigned preference.

12. The computer readable medium as claimed in claim 11, wherein at least one relationship is within one space selected from the group consisting of the user space, the content space, the data space, the master-data space, and the metadata space.

13. The computer readable medium as claimed in claim 11, wherein the merging resulted from a drag-and-drop action in the user space.

14. The computer readable medium as claimed in claim 11, wherein the merging is based on a preference in the user space.

15. The computer readable medium as claimed in claim 11, wherein the merging is based on a locale in the user space.

16. A computer system for merging two objects in a business intelligence system including a user space, a content space, a data space, a master-data space and a metadata space, the computer system comprising:

at least one processor configured for:
determining relationships between members selected from at least one of the user space, the content space, the data space, the master-data space, and the metadata space, resulting in a plurality of determined relationships for the members in the business intelligence system, wherein the determined relationships link the members in the business intelligence system;

enabling selection of two members in the content space to be combined, wherein each of the two members includes a chart and the combination of the two members produces a new chart;

traversing relationships for each of the two members with other members in the business intelligence system in the plurality of determined relationships;

determining the members of the business intelligence system in the traversed relationships, wherein the determined members provide information pertaining to the charts;

assigning a preference for merging to the members of the business intelligence system in the traversed relationships with close or exact relationships; and merging the selected two members from the content space to produce the new chart by merging into the new chart the determined members in the traversed relationships with the assigned preference.

17. The computer system as claimed in claim 16, wherein at least one relationship is within one space selected from the group consisting of the user space, the content space, the data space, the master-data space, and the metadata space.

18. The computer system as claimed in claim 16, wherein the merging resulted from a drag-and-drop action in the user space.

19. The computer system as claimed in claim 16, wherein the merging is based on a preference in the user space.

20. The computer system as claimed in claim 16, wherein the merging is based on a locale in the user space.

* * * * *